United States Patent [19]

Hughett et al.

[11] Patent Number: 5,500,456

[45] Date of Patent: Mar. 19, 1996

[54] TIRE SEALER AND INFLATOR

[75] Inventors: Paul D. Hughett, Jacksonville, Fla.; Montfort A. Johnsen, Danville, Ill.

[73] Assignee: Snap Products, Inc., Durham, N.C.

[21] Appl. No.: 186,780

[22] Filed: Jan. 26, 1994

[51] Int. Cl.$^6$ .............................. B29C 73/16; C08L 1/02; C08K 5/06; C08K 3/36

[52] U.S. Cl. .............................. 523/166; 524/13; 524/366; 524/378; 524/464; 524/492; 524/493; 524/534; 524/565

[58] Field of Search ........................... 523/166; 524/13, 524/366, 378, 464, 492, 493, 534, 565

[56] References Cited

U.S. PATENT DOCUMENTS

| | | | |
|---|---|---|---|
| 3,676,381 | 7/1972 | Silverstein | 523/166 |
| 4,501,825 | 2/1985 | Maggar et al. | 521/78 |
| 5,284,895 | 2/1994 | Gupta | 524/378 |
| 5,338,776 | 8/1994 | Peelor et al. | 523/166 |

FOREIGN PATENT DOCUMENTS

| | | | |
|---|---|---|---|
| 2251436 | 7/1992 | United Kingdom | 523/166 |

*Primary Examiner*—Peter A. Szekely
*Attorney, Agent, or Firm*—Richard E. Jenkins

[57] ABSTRACT

A new tire sealant and inflator composition is described which utilizes a sealant having superior performance, presented in a water-based carrier, and with an inflator composition consisting of mainly dimethyl ether, modified by trichloroethylene and nitrogen gas. The composition comprises a terpolymeric latex sealant emulsion, prevented from coagulating or vulcanizing in the dispenser by the addition of additives, and made more potent by the inclusion of certain wood flours having selected particle size distributions. Other ingredients, such as propylene glycol, a surfactant, triethanolamine and ammonia, confer special attributes; for example, softening the wood flour particles and keeping them dispersed in the aerosol can, while causing them to pack down into a sealing matrix once added to a tire having a puncture. Since no environmentally acceptable gases exist that can be used in aerosol sealant/inflator products, a combination has been selected which is far less intrinsically flammable than the very commonly used propane/butane (LP-Gas) propellants.

10 Claims, No Drawings

TIRE SEALER AND INFLATOR

FIELD OF INVENTION

This invention relates to a novel composition of matter and to a method for inflating vehicular tires of all types therewith. More specifically, the present invention relates to a composition of matter for inflating vehicular tires which comprises a composite sealant of wood flour and congealed latex, together with an inflating composition evidencing low flammability which is non-depleting to the stratospheric ozone layer and a non-contributor to global warming.

BACKGROUND OF THE INVENTION

Portable tire sealing and inflating aerosols are well known. These specialty items were introduced during the early 1960's and currently represent a market of about 30,000,000 units per year in the U.S.A. alone. Carrying a product of this type assures motorists that they can make fast repairs when confronted with a flat or under-inflated tire. This can be important if the driver happens to be in a remote, inclement or dangerous location, or if the vehicle does not contain a suitably inflated spare tire.

A significant number of prior art tire sealant and inflator compositions have been described in the patent literature since 1968. Typically, this literature discloses various water-based or sometimes anhydrous formulations, comprising a polymeric sealant, an anti-freeze ingredient, an emulsifier, aerosol can corrosion inhibitors, and occasionally the use of solids, such as asbestos fibers, fiberglass fibers, or (simply) fibers. The cited U.S. Patents by Kent, Ornum and Magyar are typical. All patents cited as references are incorporated herein as if reproduced in full below.

The described composition must also include a propellant designed to quickly evacuate the self-pressurized contents of the dispenser into the tire via a short length of connecting hose that is supplied with the product. The ideal propellant will have a substantial vapor pressure in the aerosol can, even at low temperatures, and be capable of generating sufficient pressure in tires so that the vehicle can be safely driven. The ideal propellant will also be non-inflammable, non-toxic, non-corrosive and reasonably inexpensive.

During the past decade, such non-flammable propellants as dichlorodifluoromethane ($CCl_2F_2$), sym.dichlorotetrafluoroethane ($CClF_2$—$CClF_2$), with $CCl_2F_2$, and monochlorodifluoromethane ($CHClF_2$) have been used commercially for tire sealant/inflator products. However, each of them has been noted as evidencing significant (stratospheric) ozone depletion potential, and their use has now been severely limited to only the most essential type aerosol products.

More recently, U.S. Pat. No. 5,124,395 to Abramowski disclosed the use of 1,1,1,2-tetrafluroroethane ($CH_2F$—$CF_3$) as a non-flammable propellant. While not having stratospheric ozone depletion potential (ODP), this very stable gas has a very significant global warming potential (GWP), sometimes called a green-house effect. It is 2,250 times as potent as carbon dioxide as a global warming agent and, because of this, major suppliers are severely restricting its use to those aerosol products considered essential for life-saving or military applications.

At this time, no other commercially available non-flammable propellant liquids are available which do not evidence significant environmental short-comings. Some laboratory curiosities exist, such as perfluorodimethyl ether ($CF_3$—O—$CF_3$), but the economics of toxicological testing, plant construction and verification of environmental compatibility status make their commercialization very unlikely. Because of this, the three-component blend described in the present invention appears to be an optimum choice between the non-flammable (but unavailable) propellants, and the extremely flammable (generally used) propellants for tire sealing and inflating aerosols.

The so-called high pressure compressed gases, such as carbon dioxide ($CO_2$), nitrous oxide ($N_2O$), nitrogen ($N_2$) and air ($N_2/O_2$), are both environmentally acceptable and non-flammable, but, by themselves, are totally ineffective as tire inflators. This is because relatively little of these gaseous propellants can be compressed into aerosol dispensers (regardless of the content) before the pressure exceeds 180 psi-gage at 130° F., the limit imposed by the U.S. Department of Transportation for interstate shipping purposes. For example, by injecting nitrogen gas into the largest aerosol can (48.6 in$^3$ capacity) until the pressure comes to 140 psi-gage at ambient, which is very close to the pressure limit for this container, and then connecting this can to a relatively large P215/85 R15 tire (2454 in$^3$ capacity if not flattened), the tire pressure can be raised from 0 psi-gage to 2.7 psi-gage. Even assuming no gas loss through the puncture in such a deflated tire, it is seen that many cans of nitrogen gas would be required to attain reasonable tire pressure.

It is a feature of our invention that nitrogen gas (or compressed air) be used in conjunction with dimethyl ether and trichloroethylene to produce the desired vapor pressures over an extremely wide temperature range, extending from below 0° F. to above 165° F. The nitrogen also greatly augments the pressure of the dimethyl ether and trichloroethylene and, thus, facilitates a much faster transfer of the product from the dispenser, since virtually no back-pressure of nitrogen can accrue in the tire to retard the flow rate.

It is a further object of the present invention to create a composite propellant that will exhibit the minimum degree of intrinsic flammability, given the limitations described above. Burning is an oxidative process. For example, when hydrocarbons are burned, totally unoxidized substances are reacted with oxygen to ultimately produce water vapor, carbon dioxide and a large amount of heat. In contrast, the dimethyl ether molecules ($CH_3$—O—$CH_3$) may be considered as partly oxidized hydrocarbon material. About 35% by weight is comprised of oxygen. The remainder is potentially flammable. By calorimetry, it can be shown that the combustion of dimethyl ether only produces about 65% as much heat per unit weight as do the typical hydrocarbon gases; e.g., propane and butane. The presence of non-flammable nitrogen and trichloroethylene acts to dilute the dimethyl ether vapors somewhat, absorbing some of the heat generated if combustion should occur, and raising the Lower Explosive Limit (LEL) to values at least twice as high as those of the commonly used hydrocarbon blends for tire sealing and inflating aerosols.

Because approximately 40% of the weight of the aerosol vapors in the inflated tire is now composed of chemically bound oxygen, trichloroethylene and nitrogen, the combustion of this mixture will produce the heat that is mitigated by the need to also heat up these non-combustible atoms and molecules. Thus, intensely high heating, which may be destructive to tires, can be more readily avoided with our preferred blends of inflating gases.

A final attribute of the inflative process involves the very significant pressure depressant effect exerted upon the dimethyl ether by the other components of the formula. Pure dimethyl ether has a vapor pressure of about 62.5 psi-gage at 70° F. In contrast, the partial pressure of dimethyl ether in the preferred formulations is only 10 to 13 psi-gage at 70° F. This permits more non-flammable nitrogen (or compressed air, or trifluoromethane) to be added and this, in turn, allows the compositions to be used over a substantially wider temperature range than other products of this type.

In the case of aerosol products designed to be stored in cars until needed, such as sealers and inflators, one must recognize that car interiors may be heated to rather extreme temperatures when the vehicle stands for a time in the sunlight during a very hot day. Dark colored cars are especially affected. A study by the Armor All Corporation (Motor Trend Car Care Guide), APR-1993), showed that temperatures ranged from 157° to 241° F. under such conditions. The hottest areas were the dashboard, front seat surfaces and rear deck.

The lag effect in heating up a typical 12 oz. to 20 oz. aerosol can to such temperatures, with only the transfer effects of hot air, is undoubtedly a factor in preventing all but a few car care and service aerosols from becoming so overheated that they eventually buckle and burst. The overheating problem is countered by using formulas with low pressure propellants, with propellants that rise only slowly in pressure when heated, or by using containers that have pressure relief fitments—causing them to leak product if excessively heated. The use of nitrogen, coupled with a higher pressure liquid propellant whose pressure is suppressed by other ingredients, is a useful approach. It provides acceptable pressures from below 0° F. to above 165° F. By reducing the nitrogen content, even higher temperatures can be safely tolerated.

At the same time, the unit may be required to function in very cold conditions. Surprisingly, it has been found that dimethyl ether serves as an excellent anti-freezant for the water in the formulation. The propylene glycol reinforces this effect, keeping the water liquid at least to −20° F.

As is well known to formulators, the freezing of water is accompanied by about a 10% expansion of product volume, and this may permanently distort some full aerosol dispensers. Also, resins, latexes and other polymeric emulsions may evince freeze/thaw instability by breaking down and causing the product to be inverted, agglomerated, or otherwise rendered unfit for use. Perhaps, most importantly, if a motorist requires the product in extremely cold weather conditions, and it fails to work because it has frozen in the can, the result may range from exasperating to life-threatening.

The usual sealant/inflator composition contains about 70% to 75% of water and 4% to 6% of either ethylene glycol or propylene glycol anti-freezes. Solutions of this type freeze at 27° F. to 29° F. From this, it is apparent that the standard compositions are woefully inadequate when one attempts to use them at temperatures of 25° F. or below.

Exacerbating this problem is the fact that a number of sealant/inflator compositions develop such low pressures that they cannot transfer material into the deflated tire if the aerosol is below about 30° to 40° F. This occurs because they include butanes or other low pressure propellants, which provide reduced possibilities for can eversion or bursting if overheated in hot summer weather.

SUMMARY OF THE INVENTION

These and other objects of the present invention are embodied in the preparation of a novel sealant/inflator composition, packaged in any standard aerosol container, where the concentrate contains a vulcanizable latex emulsion in a water-based medium to which wood flour of a specified particle size distribution has been added, together with other facilitating and adjuviant materials, and in which the propellant comprises a highly solubilized dimethyl ether and nitrogen, modified by the addition of trichlorethylene. The composition is preferably formed by using optimum percentages of these ingredients, thereby making it capable of sealing punctures in vehicular tires with a vulcanized or coagulated matrix of rubber and tightly packed, softened wood flour. When dried and heated by tire friction on roadways, the resultant mass continues to cure and become more refractory. At the same time, the unique blend of propellants is less intrinsically flammable then the commonly used hydrocarbon gas-liquids, is not a depleter of stratospheric ozone, does not sponsor global warming, is essentially non-toxic, and provides useful pressures through a surprisingly large range of temperatures.

Many special attributes are needed in order to optimize these desirable features. For example, ammonium hydroxide (29.4% ammonia, $NH_3$) is used to provide corrosion inhibition and to soften the wood flour particles by solubilizing the hemicellulose fibers and neutralizing carboxylic acid moieties in the lignin component. This softening action is considerably enhanced by the use of a non-ionic detergent, and further promoted by the solubilizing action of trichloroethylene. This solvent also acts to dissolve waxes, oils, terpenes and traces of sulfur-based organics present in lignin. By selecting a wood flour prepared from a softwood tree, and thus having a soft, porous, readily deformable structure even before modification, the action of these solvents produces a structured, highly packable, very soft and interlocking wood matrix when forced into tire puncture holes by the usual combination of gas/air pressure in the tire, and centrifugal action.

The wood flour has been selected from a source in which the wood of the Ponderosa Pine tree ("Pinus Ponderosa")is micro-shredded into very small particles that are easily able to pass through aerosol and tire valves unimpeded by orifices, but which are also diverse in size, ranging from about 0.0150 inch, down to below 0.0001 inch. This diversity is important in forming a seal.

The larger diameter particles are capable of packing into holes made with 40-D steel spikes (roughly 0.250 inch in diameter); the intermediate size particles then squeeze into the spaces between the larger ones, and the smallest size particles are then forced into the very small interstices between the intermediate ones. Finally, any remaining fissures of micro-crevices become plugged with another ingredient added for that purpose, an extremely finely divided grade of pyrogenic silica. This ability to build a solid matrix enables the product to seal puncture holes in a few seconds and, thus, with the minimum release of inflating gas. Competitive products have been tested, and none have been found capable of repairing such puncture wounds. In fact, the poor performance of self-pressurized sealant/inflator products—except for very small punctures—is a major complaint and concern for marketers in this product line.

Physically sealing a tire puncture with a matrix of wood flour is, of course, insufficient for long-term utility, so in the present invention a major ingredient of the formula is a carboxylated terpolymer of butadiene, styrene and acrylonitrile that is capable of forming very strong elastic (rubbery) structures, with or without vulcanization. By using at least about 7%, solids basis, of this type polymer in the product dispersion, the polymer impregnates the wood particles so that when they pack tightly into the puncture hole it cross-links and quickly builds a rubbery mass that adhesively holds the plug firmly together, and at the same time, bonds firmly to the jagged wall of the hole itself, thus producing a plug of outstanding durability and tenacity. The plug, in fact, is so reliable that it becomes optional to the consumer whether or not the tire should be taken to a service station for patching. No other sealant/inflator product possesses this degree of utility.

The use of "fibers" in the sealing of punctured tires is not new, having been described by Kent, et al, in U.S. Pat. No. 4,101,494 (5/1978), and in several later patents, including those cited earlier. U.S. Pat. No. 4,501,825 (2/1985) issued to Magyar, et al, discloses a wide variety of fibers, with a preference for cellulosics. They are claimed to promote clotting and speed the setting of latex polymers in the puncture hole.

It is a particular object of the present invention to utilize the relatively unique attributes of a particular class of terpolymers to produce a rubbery matrix about the packed wood flour fibers. This goes well beyond the simple drying out or setting of a polymer solution or dispersion. The preferred terpolymeric structures undergo drying, curing and vulcanization to various degrees, once within the puncture wound. The rate and degree are dependent upon tire conditions, the chemistry of the wood flour, compressive and decompressive flexing of the plugging matrix as the vehicle is operated, heat development as the vehicle is driven, free sulfur exposed at the jagged edges of the rubber tire puncture hole, other formula ingredients, and so forth. The result is the development of a rubber-like sontinuous mass, surrounding the wood flour, bonding the particles together, and also to the puncture wall of the tire.

Although the term "latex" appears in several U.S. patents, it is generally used in a very broad context, as in U.S. Pat. No. 5,124,395 (Abramowski, et al), (6/1992) "Preferably the sealer is a latex, or a polyvinyl acetate, or any other sealant capable of . . . " When covered in any greater detail, amounts in the range of 20% to of the concentrate are suggested, with 20% to 40% of resin or rosin, which our research finds unnecessary. Our preferred carboxylated terpolymers of butadiene, styrene and acrylonitrile latexes are never mentioned in the above-cited U.S. Patent literature.

Various other objects, benefits and advantages of the invention will become apparent as the description thereof proceeds.

In satisfaction of the foregoing and subsequent objects, the present invention provides a highly superior tire sealant and inflator composition comprising the following components:

| COMPONENT | WEIGHT PERCENT |
|---|---|
| Sealer (Solids Basis) | 4–30 |
| Alkylene Glycol | 2–8 |
| Softwood Flour | 0.3–3.5 |
| Pyrogenic Silica Powder | 0.1–0.5 |
| Corrosion Inhibitor | 0.1–0.5 |
| Non-ionic Surfactant | 0.2–1.0 |
| Ammonium Hydroxide (28° Be) | 0.2–1.0 |
| Adjuviant | 0.2–1.0 |
| Triethanolamine | |
| Fluorescent Tracer | |
| Trichloroethylene | 4–30 |
| Dimethyl Ether | 10–30 |
| Nitrogen | 0.1–0.4 |
| Pure Water | Balance |

The sealer in the tire sealant and inflator composition can be a modified terpolymeric latex sealant. The modified terpolymeric latex sealant may be a heat reactive, carboxylated terpolymer of butadiene, styrene and acrylonitrile dispersion in water. The modified terpolymeric latex sealant may be a heat sensitizable, carboxylated terpolymer of butadiene, styrene and acrylonitrile, dispersed in pure water and able to be cross-linked at ambient temperatures using conventional rubber vulcanizing techniques, or by other carbonyl reactive cross-linking materials. The carbonyl cross-linking material may comprise melamine formaldehyde, zinc oxide, or epoxy resins.

The composition is applied to a punctured or de-pressurized tire, using a self-pressurized (aerosol) container typically filled with about 0.5 to 1.5 pounds of total product. Although ordinary aerosol tinplate or aluminum cans may be used, due to the opportunity for severe overheating that exists for products carried in vehicles for repair or other purposes, it is recommended that the higher test "DOT Specification 2Q" aerosol container be employed—thus, statistically reducing the opportunities for distortion or rupture.

The composition is applied into the tire by connecting the can to the tire valve stem and actuating the can valve. The total content is injected into the tire within about one minute, under a very broad range of temperatures.

Once released into the interior of the tire, the latter must be rotated so that the liquid product can quickly contact the puncture wound or other source of leakage and begin the plugging phase. The sealer then seals the puncture, typically within several seconds, so that gas loss from that location is minimized. Meanwhile, the gaseous phase, consisting mainly of dimethyl ether, but diluted with non-flammable trichloroethylene and nitrogen vapors, acts to inflate the tire to such pressures as are required to operate the vehicle. The degree of inflation depends upon the percent of propellants, the fill weight of product in the dispenser, completeness of the transfer process, and the volume of the tire cavity.

DETAILED DESCRIPTION OF THE INVENTION

Any tire sealant/inflator composition must have certain characteristics in order to provide the anticipated function of sealing and re-inflating depressurized tires—even under varied and often adverse conditions of climate, tire wear, size of puncture, and possible retention of the puncturing entity by the tire. In the last instance, when the penetrating object is removed, the sealant should still be able to flow into the hole, pack it and expeditiously seal it.

Additionally, the repair seal must have durability. It must be capable of withstanding the flexing of the sealed hole as the vehicle travels along roads, as well as the inevitable increase in tire temperature (due to friction) as the vehicle travels at moderate to high speeds.

The sealant must be capable of being reliably transferred from the dispenser into the tire in rapid fashion, without plugging valves, or pressure equalization effects that would result in only a portion of the contents being transferred.

The sealant must remain in the self-pressurized dispenser for long periods, without corroding the container, hard-packing the solid portions at the bottom, curing of the polymer or latex sealant component into solids, and without leaking the contents during storage.

Finally, the dispenser must contain sufficient deliverable gas or vaporizing material into the tire as to raise the tire pressure from 0 psi-gage, to from about 12 to 30 psi-gage, to enable the tire to support the weight of the vehicle (even if loaded, as in trucks), but without materially exceeding the manufacturer's inflation recommendations. These inflation pressures, coupled with exigencies of driving the tire on various roads, at various temperatures, and for reasonable distances, must not act in concert to re-open the puncture wound.

Certain relatively optional attributes of such products may also be of value, as they support the acceptability of the primary functions, to the benefit of both consumer and marketer. One would include the use of a sophisticated propellant blend, providing what appears to be the minimum intrinsic flammability/explosivity attributes that are possible—now that the useful non-flammable propellants have been essentially removed from aerosol applications by actions taken by the United Nations (Montreal Protocol II), the U.S. Congress (The Federal Clean Air Act Amendments—1990), and the U.S. Environmental Protection Agency.

Another is the inclusion of an alkylene glycol to assist the dimethyl ether in keeping the product from freezing in the can at very low temperatures, while at the same time, keeping the dispensed product from freezing within the tire, once much of the dimethyl ether anti-freezant evaporates into the air space of the tire during the inflation process.

Serendipitously, the use of our preferred anti-freezant, propylene glycol, confers anticoagulation and other benefits to prolong the service life of the packaged composition. Additionally, it does not have the poisonous properties of ethylene glycol, which is generally used in sealant/inflators because of its somewhat better efficiency as an anti-freeze and its lower price.

Another ancillary benefit arises from the inclusion of a very small amount of sodium fluorescein, or some similar fluorescent or phosphorescent material, in the formula. In the extremely rare case of a hazardous event, where the identification of the dispenser, brand name or marketer cannot be determined during the course of a law suit (tort), the tire or tire rim may or may not bear traces of telltale light-activated chemical, and this finding can be of assistance in establishing use or non-use of the marketer's product.

Referring to the generalized formulation given earlier, the sealer component is present in an amount of from about 4% to 30%. In the preferred embodiments, the resin is present at about 7% to 12% of the total formula. As stated, these percentages refer to the total solids basis of the resin dispersion in water, and consider that emulsifiers, possible corrosion inhibitors and preservatives may also be present in small amounts. In the case of one preferred sealant: Hycar 1578X 1 high performance latex carboxylated terpolymers of butadience, styrene and acrylonitrile, the total solids content is 47% by weight.

Amounts as low as about 4% sealer are sufficient to efficiently repair small to medium size punctures in tires, but for larger punctures the repair time is extended, and this may allow sufficient time for inflator gases to exit the tire that insufficient pressure may remain once full sealing has been effected.

U.S. Pat. No. 5,124,395 recites the use of 3.72% of Flexbond 150 (polyvinyl acetate solids) in their concentrate—or (Example 4) 2.31% in the total formula. Commercial products may use as little as about 4.30% in their total formulas. However, such products have been shown to possess inadequate to marginal sealing abilities, even for very small punctures. They do not use fibrous ingredients.

The fibre content of the present invention is wood flour, obtained from the Ponderosa Pine tree (Pinus Ponderosa), although corresponding products from other softwood trees should work with equal facility. From about 0.3% to 3.5% wood flour may be used, but the preferred range is about 0.5% to 1.5%. The ingredient is modified by other components of the formula.

The particle size distribution is critical to success. If the size of the largest particles is excessive, plugging may occur at the tire valve, or (more likely) the aerosol valve. On the other hand, if the largest particles are too small, all of the fibers will pass through the puncture without the ability to form "log jams" that will lead toward plugging the hole. None of the patents we have reviewed make any particular distinctions relating to the particle size distribution of fibers. Nor, do any report the use of wood flour—except in the generic framework of "organic fibers" or "cellulosic fibers."

After testing several wood flours, it was determined that a preferred embodiment is one derived from Ponderosa Pine, called Pine 8020, sold by Composition Materials of America, Inc. (Montgomery, Ala.). This particular wood flour has a modest acidity—natural and for preservation—a moisture content of 5% to 7%, and an ash content of 0.35% inorganic sulfates, oxides and phosphates. The color is light buff.

The particle size distribution, which will vary slightly from lot to lot, is given in following tabulation:

| PARTICLE SIZE | | |
|---|---|---|
| Range (Microns) | Range (inches) | Weight Percent |
| 250 to 425 | 0.010 to 0.017 | 0 to 0.09 |
| 180 to 250 | 0.007 to 0.010 | 0 to 5.0 |
| 150 to 180 | 0.006 to 0.007 | 0 to 10 |
| 125 to 150 | 0.005 to 0.006 | 5 to 15 |
| 106 to 125 | 0.004 to 0.005 | 5 to 35 |
| 75 to 106 | 0.003 to 0.004 | 15 to 25 |
| "0" to 75 | "0.000" to 0.003 | 30 to 50 |

The composition of Ponderosa Pine will have obvious variations between heartwood and sapwood, compressed or de-compressed areas, upper area or the bole, and, according to soil composition, tree maturity, time of year, atmospheric conditions (acid rain, ozone, humidity, temperature) and so forth. As a result, any attempt to set forth the composition must be regarded as a snap-shot for a given tree. Most assays are for the heartwood, which is more massive and of greater industrial importance. The following table will provide general information:

| Primary Ingredient or Group | Individual Components | Primary Item or Group (% by Weight) | Individual Components %) Of Prim.) |
|---|---|---|---|
| Cellulose | Alpha-Cellulose | 50.2 | 53.0 |
| | Beta-Cellulose | | 20.7 |
| | Gamma-Cellulose | | 17.8 |
| | Pentosans | | 6.6 |
| | Methyl Pentosans | | 1.9 |
| Hemi-Cellulose Polysaccharides | Xylans | 9.0 | (largest) |
| | Glucans | | (next largest) |
| | Galucans | | |
| | Mannans | | |
| | Arabinans | | |
| | Glucuronans | | |
| | Galacturonans | | |
| | Rhamnans | | |
| | Fucans | | |

-continued

| Primary Ingredient or Group | Individual Components | Primary Item or Group (% by Weight) | Individual Components %) Of Prim.) |
|---|---|---|---|
| Lignin | Uronic Anhydride Coniferyl Alcohol p-Coumaryl Alcohol Sinapyl Alcohol | 26.1 | (smallest) |
| Pentosans | | 8.6 | |
| Methyl Pentosans | | 1.0 | |
| Water | | 2.9 | |
| Acetic Acid | | 1.4 | |
| Propionic Acid | | 0.2 | |
| Ash | Sulfates, oxides, . . . | 0.4 | |
| Oleoresins | Turpentine, rosins, . . . | 0.2 | |

Sulfur is present in wood, since it is essential to all plant and animal life. Some is present as $-OSO_3H$ and $-OSO_2H$ units, replacing the hydrogen (H) of hydroxyl (OH) and, on occasion, beta-D-xylopyranose and similar residues in pentosan polymeric wood structures. Pine rosin acids—isomeric with abietic acid, dihydroabietic acid and dehydroabietic acid—contain sulfur in various valence states. The sulfur content of trees is generally about 0.05% in contrast to humans (0.25%), lignite coals (0.40%) and petroleum oils (0.30% minimum).

The Ponderosa Pine wood flour is softened, its acidic groups are neutralized, and a significant portion is solubilized by soaking with the dilute ammonia solution in the aerosol can over long periods. It is known that hot water dissolves from 4.0% to 7.7% of the wood flour, and that 1% sodium hydroxide dissolves 16.0% to 19.2%. From these and other data, dilute ammonium hydroxide is thought to dissolve about 10%. The cellulose structures are not affected significantly, but the interwoven structure of the lignin and hemi-cellulose cells are markedly affected. Increasing soak time or temperature acts to increase solubility. It is thought that sulfur moieties are released from the wood flour in this process, since the addition of ammoniated wood flour to the vulcanizable carboxylated terpolymer resins can cause the formation of skins, film or clots of rubber-like matter upon the can walls and diptube of the aerosol dispenser if retardant agents are not also included.

When the 0.50% amount of ammonium hydroxide (29.4% $NH_3$) is added to the wood flour slurry, during the compounding of the concentrate, the temperature rises by about 15° F.—a sure indication of a chemical reaction.

The wood flour is further softened by the addition of the non-ionic surfactant, which aids in the penetration and soaking process. Finally, the trichloroethylene solvent can act to dissolve various rosins, waxes and other lipophilic constituents, opening the pore of the wood flour still further to softening influences.

The gross result of these diverse dissolving and softening actions is to get wood sulfur into the concentrate, and to prevent the particles from bridging across valve orifices and, thus, cause plugging, partial plugging or hesitations in the delivery of product to the interior of the tire.

Once in the tire, and with the tire rotated (often by hand) to get the sudsy liquid to wash all the interior surfaces—including the puncture area—the spongey, deformable wood flour particles enter the puncture, carried into it by escaping air and gas, and begin the sealing process, As mentioned earlier, they interlock, with the smaller particles filling the voids between the larger ones, and with the very smallest remaining voids (often insignificant) filled with the extremely finely divided pyrogenic silica particles. These particles are very porous, which also aids the process. This tire pressure continually forces the terpolymeric latex emulsion against the seal. Some is already inside the plug, having been present at the time when the plug was clotting or coming together and being compressed. Under these conditions, the terpolymeric latex can begin to form films. Vulcanization is unnecessary for it to form such cross-polymeric films, but to the extent that free or combined sulfur is available at the site, the terpolymer can produce even stronger, more rubbery and more durable matrixes that act to bind the wood flour mass together, and to the rubber wall surfaces within the puncture slit. There is some free sulfur in the composition of all vulcanized rubber tires, plus some released by the partly solubilized wood flour. This appears sufficient to provide a modicum of vulcanization over time. The process continues, and is accelerated as the car is driven, so that tire temperatures can increase. At a typical 65 mph, tire temperatures average about 230° F.

The following exemplary embodiments have been set forth solely for purposes of exposition and are not to be construed as limiting.

EXAMPLE

Variations of the formulation set forth below were prepared with three commercially available latexes:

| | |
|---|---|
| Hycar 1578X1 (or 1578X7 or 1580) Latexes | X.00%* (Solids Basis) |
| Pure Water | (59.40–X.00)% |
| G. Fine (Pine #8020 Wood Flour) | 1.25% |
| Cab-O-Sil M5 (Silica) | 0.30% |
| Mazon RI-6 (Corrosion Inhibitor) | 0.30% |
| Ammonium Hydroxide (29.4% $HN_3$ - typical) | 0.50% |
| Triethanolamine | 0.50% |
| Igepal CA 897 (Surfactant) | 0.50% |
| Tinopal SFP (Fluorescent Additive) | 0.02% |
| Propylene Glycol (Anti-freezant) | 6.00% |
| Dimethyl Ether (DME) | 17.00% |
| Nitrogen - to 100 psi-g at 85° F. | 0.23% |
| Trichloroethylene | 14.00% |

*X = 5 to 20%

The Hycar latexes are all "carboxylated terpolymer of butadiene, styrene and acrylonitrile," produced by B.F. Goodrich Company. They differ somewhat in tensile strength of films, elongation stress, solvent resistance, heat stability, and so forth, but are considered to be equivalent in terms of testing for this tire inflator/sealing application. They can be used interchangeably.

The amount of DME was tested at 14, 17 and 20% levels. The 14% units produced insufficient inflation pressure in tires. The 17% and 20% formulas gave satisfactory tire pressures.

Following, a tire identified as "0205×75 R15," suitable for use with Broncho II vehicles, was punctured with either a 30-D large nail or a 40-D spike, thus making a very large puncture, through which the tire quickly deflated to 0.0 psi-g.

The tire was then placed on a mechanical spinner, able to rotate it at 34 rpm (equivalent to 2.7 mph), or to 64 rpm (equivalent to 5.0 mph). The contents of a typical 211×713

(one pound) aerosol can were then injected into the tire. The tire was spun, allowing the liquid product to wet all inner surfaces of tire and rim, including the puncture. The length of time from start up to the formation of a seal was then determined.

| Test No. | Hycar Latex, Value of X | Nail Size | Spin RPM | Time to Seal Seconds |
|---|---|---|---|---|
| 1. | 5 | 30-D | 64 | 60 (V. Slow Seep) |
| 2. | 6 | 30-D | 64 | 35 |
| 3. | 7 | 30-D | 64 | 20–25 |
| 4. | 8 | 30-D | 64 | 15 |
| 5. | 9 | 30-D | 64 | 10 |
| 6. | 7 | 40-D | 34 | 10–50* |
| 7. | 8 | 40-D | 34 | 50 |
| 8. | 9 | 40-D | 34 | 35 |
| 9. | 14 | 40-D | 34 | 20 |
| 10. | 20 | 40-D | 34 | 10 |

*Tire pressure ranged from 16 psi-g (10 sec.) to 8 psi-g (50 sec.)

The tires treated in the foregoing manner were then assessed, and it was determined that all seals, but for Example 1, were found to be within the range of semi-permanent to permanent. Tire pressures remained acceptable for thirty days, after which the tires could be cleaned of the sealant and tested further.

While the invention has been described in detail in the foregoing specification, it will be appreciated by those skilled in the art that variations may be made without departure from the spirit and scope of the invention.

What is claimed is:

1. A tire sealant and inflator composition comprising:
    (a) 4 to 30 wt. % of a modified terpolymeric latex sealant (solids basis), wherein the sealant is a heat sensitizable, carboxylated terpolymer of butadiene, styrene and acrylonitrile, dispersed in pure water and able to be cross-linked at ambient temperatures using conventional rubber vulcanizing techniques, or by other carbonyl reactive cross-linking materials;
    (b) 2 to 9 wt. % of an alkylene glycol;
    (c) 0.3 to 3.5 wt. % of softwood flour;
    (d) 0.1 to 0.5 wt. % of pyrogenically formed silica powder;
    (e) 0.2 to 1.0 wt. % of a non-ionic surfactant;
    (f) 0.2 to 1.0 wt. % of ammonium hydroxide (29.4 weight percent ammonia in water basis);
    (g) 4 to 30 wt. % of trichloroethylene;
    (h) 10 to 30 wt. % of dimethyl ether;
    (i) 0.1 to 0.4 wt. % of nitrogen gas;
    (j) balance, pure water;
    together with minor ingredients selected from the group consisting of corrosion inhibitors, alkanolamine and sodium fluorescein.

2. A composition according to claim 1, wherein the carbonyl cross-linking material comprises melamine formaldehyde.

3. A composition according to claim 1, wherein the carbonyl cross-linking material comprises zinc oxide.

4. A composition according to claim 1, wherein the carbonyl cross-linking material comprises epoxy resins.

5. A tire sealant and inflator composition comprising:
    (a) from about 4 to about 30 weight percent on a solids basis of a modified terpolymeric latex sealant, the sealant being a heat reactive, carboxylated terpolymer of butadiene, styrene and acrylonitrile dispersion;
    (b) from about 2 to about 9 weight percent of an alkylene glycol;
    (c) from about 0.3 to about 3.5 weight percent of softwood flour;
    (d) from about 0.1 to about 0.5 weight percent of pyrogenically formed silica powder;
    (e) from about 0.2 to about 1.0 weight percent of a non-ionic surfactant;
    (f) from about 0.2 to about 1.0 weight percent of ammonium hydroxide on a basis of approximately 29.4 weight percent ammonia in water;
    (g) from about 4.0 to about 30.0 weight percent of trichloroethylene;
    (h) from about 10 to about 30 weight percent of dimethyl ether;
    (i) from about 0.1 to about 0.4 weight percent of nitrogen gas; and
    (j) up to about 80 weight percent water.

6. A tire sealant and inflator composition comprising:
    (a) from about 4 to about 30 weight percent on a solids basis of a modified terpolymeric latex sealant, the sealant being a heat reactive, carboxylated terpolymer of butadiene, styrene and acrylonitrile dispersion;
    (b) from about 2 to about 9 weight percent of an alkylene glycol;
    (c) from about 0.3 to about 3.5 weight percent of softwood flour;
    (d) from about 0.1 to about 0.5 weight percent of pyrogenically formed silica powder;
    (e) from about 0.2 to about 1.0 weight percent of a non-ionic surfactant;
    (f) from about 0.2 to about 1.0 weight percent of ammonium hydroxide on a basis of approximately 29.4 weight percent ammonia in water;
    (g) from about 4.0 to about 30.0 weight percent of trichloroethylene;
    (h) from about 10 to about 30 weight percent of dimethyl ether;
    (i) from about 0.1 to about 0.4 weight percent of nitrogen gas;
    (j) up to about 80 weight percent water; and
    (k) minor ingredients selected from the group consisting of corrosion inhibitors, alkanolamine and sodium fluorescein.

7. A tire sealant and inflator composition comprising:
    (a) from about 4 to about 30 weight percent on a solids basis of a modified terpolymeric latex sealant, the sealant being a heat reactive, carboxylated terpolymer of butadiene, styrene and acrylonitrile dispersion;
    (b) from about 2 to about 9 weight percent of propylene glycol;
    (c) from about 0.3 to about 3.5 weight percent of softwood flour;
    (d) from about 0.1 to about 0.5 weight percent of pyrogenically formed silica powder;
    (e) from about 0.2 to about 1.0 weight percent of a non-ionic surfactant;
    (f) from about 0.2 to about 1.0 weight percent of ammonium hydroxide on a basis of approximately 29.4 weight percent ammonia in water;

(g) from about 4.0 to about 30.0 weight percent of trichloroethylene;

(h) from about 10 to about 30 weight percent of dimethyl ether;

(i) from about 0.1 to about 0.4 weight percent of nitrogen gas;

(j) up to about 80 weight percent water.

8. A tire sealant and inflator composition comprising:

(a) from about 4 to about 30 weight percent on a solids basis of a modified terpolymeric latex sealant, the sealant being a heat reactive, carboxylated terpolymer of butadiene, styrene and acrylonitrile dispersion;

(b) from about 2 to about 9 weight percent of an alkylene glycol;

(c) from about 0.3 to about 1.8 weight percent of softwood flour, comprising a pulverized Ponderosa Pine heartwood powder having a particle size distribution in the range of about 0.017 to about 0.0005 inch;

(d) from about 0.1 to about 0.5 weight percent of pyrogenically formed silica powder;

(e) from about 0.2 to about 1.0 weight percent of a non-ionic surfactant;

(f) from about 0.2 to about 1.0 weight percent of ammonium hydroxide on a basis of approximately 29.4 weight percent ammonia in water;

(g) from about 4.0 to about 30.0 weight percent of trichloroethylene;

(h) from about 10 to about 30 weight percent of dimethyl ether;

(i) from about 0.1 to about 0.4 weight percent of nitrogen gas; and (j) up to about 80 weight percent water.

9. A tire sealant and inflator composition comprising:

(a) from about 4 to about 30 weight percent on a solids basis of a modified terpolymeric latex sealant, the sealant being a heat reactive carboxylated terpolymer of butadiene, styrene and acrylonitrile dispersion;

(b) from about 2 to about 9 weight percent of an alkylene glycol;

(c) from about 0.3 to about 3.5 weight percent of softwood flour;

(d) from about 0.1 to about 0.5 weight percent of pyrogenically formed silica powder, wherein the silica powder is comprised of fine-particled, porous material formed by the pyrolysis of silicon (IV) chloride having an average particle size of about 0.005 micron in a flame;

(e) from about 0.2 to about 1.0 weight percent of a non-ionic surfactant;

(f) from about 0.2 to about 1.0 weight percent of ammonium hydroxide on a basis of approximately 29.4 weight percent ammonia in water;

(g) from about 4.0 to about 30.0 weight percent of trichloroethylene;

(h) from about 10 to about 30.0 weight percent of dimethyl ether;

(i) from about 0.1 to about 0.4 weight percent of nitrogen gas;

(j) up to about 80 weight percent water.

10. A tire sealant and inflator composition comprising:

(a) 4 to 30 weight percent of a modified terpolymeric latex sealant (solids basis), the sealant being a heat reactive, carboxylated terpolymer of butadiene, styrene and acrylonitrile dispersion in water;

(b) 2 to 9 weight percent of an alkylene glycol;

(c) 0.3 to 3.5 weight percent of softwood flour;

(d) 0.1 to 0.5 weight percent of pyrogenically formed silica powder;

(e) 0.2 to 1.0 weight percent of a non-ionic surfactant;

(f) 0.2 to 1.0 weight percent of ammonium hydroxide (29.4 weight percent ammonia in water);

(g) 4.0 to 30.0 weight percent of trichloroethylene;

(h) 10 to 30 weight percent of dimethyl ether;

(i) 0.1 to 0.4 weight percent of nitrogen gas;

(j) balance, pure water;

together with minor ingredients selected from the group consisting of corrosion inhibitors, alkanolamine and sodium fluorescein.

\* \* \* \* \*